United States Patent
Gane et al.

(10) Patent No.: US 9,029,448 B2
(45) Date of Patent: May 12, 2015

(54) METHOD FOR PREPARING AQUEOUS SUSPENSIONS OF MINERAL MATERIALS USING AMINES IN COMBINATION WITH VINYL-CARBOXYLIC POLYMERS

(75) Inventors: Patrick A. C. Gane, Rothrist (CH); Matthias Buri, Rothrist (CH); Samuel Rentsch, Aarburg (CH)

(73) Assignee: Omya International AG, Oftringen (CH)

( * ) Notice: Subject to any disclaimer, the term of this patent is extended or adjusted under 35 U.S.C. 154(b) by 5 days.

(21) Appl. No.: 13/883,627

(22) PCT Filed: Nov. 17, 2011

(86) PCT No.: PCT/IB2011/002724
§ 371 (c)(1),
(2), (4) Date: Jul. 15, 2013

(87) PCT Pub. No.: WO2012/066410
PCT Pub. Date: May 24, 2012

(65) Prior Publication Data
US 2014/0148538 A1     May 29, 2014

Related U.S. Application Data

(60) Provisional application No. 61/415,907, filed on Nov. 22, 2010.

(30) Foreign Application Priority Data

Nov. 19, 2010 (EP) ..................................... 10014783

(51) Int. Cl.
| | | |
|---|---|---|
| C08K 3/26 | (2006.01) | |
| C08K 5/17 | (2006.01) | |
| C08L 33/02 | (2006.01) | |
| C09C 1/02 | (2006.01) | |
| C08K 3/28 | (2006.01) | |

(52) U.S. Cl.
CPC ................ *C08K 3/26* (2013.01); *C01P 2004/61* (2013.01); *C09C 1/021* (2013.01); *C08K 3/28* (2013.01); *C01P 2006/22* (2013.01)

(58) Field of Classification Search
CPC ............. C08K 3/26; C08K 5/17; C08L 33/02
USPC .................................. 524/186, 247, 425, 556
See application file for complete search history.

(56) References Cited

U.S. PATENT DOCUMENTS

| 4,370,171 | A | 1/1983 | Robinson et al. |
| 8,545,617 | B2 * | 10/2013 | Van Hemelryck et al. ........................ 106/287.26 |
| 2006/0009560 | A1 | 1/2006 | Gane et al. |

FOREIGN PATENT DOCUMENTS

| EP | 0499267 | A2 | 8/1992 |
| EP | 0850685 | A2 | 7/1998 |
| FR | 2539137 | A1 | 7/1984 |
| FR | 2683536 | A1 | 5/1993 |
| FR | 2683537 | A1 | 5/1993 |
| FR | 2683538 | A1 | 5/1993 |
| FR | 2683539 | A1 | 5/1993 |
| FR | 2802830 | A1 | 6/2001 |
| FR | 2818165 | A1 | 6/2002 |
| FR | 2894846 | A1 | 6/2007 |
| FR | 2896171 | A1 | 7/2007 |
| FR | 2903618 | A1 | 1/2008 |
| WO | 0249765 | A2 | 6/2002 |
| WO | 02070571 | A1 | 9/2002 |
| WO | 2004014967 | A2 | 2/2004 |
| WO | 2009087330 | A2 | 7/2009 |
| WO | 2010063757 | A1 | 6/2010 |

OTHER PUBLICATIONS

BYK_Additives, Feb. 2009, download from byk.com on Jul. 21, 2014.*
The International Search Report, dated Nov. 19, 2010 for PCT Application No. PCT/IS2011/002724.
The Written Opinion of the International Searching Authority, dated Nov. 19, 2010 for PCT Application No. PCT/IS2011/002724.
Office Action dated Jan. 7, 2015 for related Taiwan Patent Application No. 100142214.

* cited by examiner

*Primary Examiner* — Vu A Nguyen
(74) *Attorney, Agent, or Firm* — Amster, Rothstein & Ebenstein LLP

(57) ABSTRACT

The invention relates to the preparation of an aqueous suspension of mineral matter by dispersion and/or grinding in the presence of at least one amine and one vinyl-carboxylic polymer, with the amine allowing to reduce the amount of the polymer and the use of the resulting suspension.

25 Claims, No Drawings

METHOD FOR PREPARING AQUEOUS SUSPENSIONS OF MINERAL MATERIALS USING AMINES IN COMBINATION WITH VINYL-CARBOXYLIC POLYMERS

CROSS-REFERENCE TO RELATED APPLICATIONS

This application is a U.S. national phase of PCT Application No. PCT/IB2011/002724, filed Nov. 17, 2011, which claims priority to European Application No. 10014783.4, filed Nov. 19, 2010 and U.S. Provisional Application No. 61/415,907, filed Nov. 22, 2010.

The present invention relates to agents used to disperse or to assist in the grinding of minerals in humid conditions.

It allows the expert to minimize the amount of vinyl-carboxylic polymers, commonly used in these operations, without altering the stability and the dry extract of aqueous suspensions of mineral matter thus manufactured. This invention is based on the to implementation of amines in combination with the said vinyl-carboxylic polymers. Surprisingly and advantageously, we manage to reduce the amount of polymer vinyl carboxylic implemented, while maintaining the above properties to a level at least equivalent to that obtained without the addition of amines under the conditions specified by the present invention.

The mineral industry is a major consumer of chemicals. These are used in various steps of conversion/modification/preparation to which mineral substances are subjected. Thus, in the case of natural or synthetic calcium carbonate, the person skilled in the art performs many operations referred to as "grinding" (reduction of particle size) in a dry or more frequently a moist medium, or "dispersion" (suspension of particles in a liquid).

These two operations are rendered easier by the use of grinding aid agents and dispersants respectively. The role of grinding agents is to minimize the yield point of the suspension during the grinding operation so as to increase the productivity of the grind mill. In this way the mechanical action of attrition and fragmentation of the particles is facilitated. As to the dispersants, they help maintain the viscosity of a suspension within acceptable ranges as the mineral substances are introduced. This allows an increase in the solids content while retaining a viscosity level that is low enough to handle the suspension and store it without the risk of sedimentation.

The prior art is particularly rich with regard to such additives. For many years, we know that the homopolymers of acrylic acid are effective agents to assist in the dispersion and wet grinding of calcium carbonate. For reference, reference may be made to documents FR 2539137 A1, FR 2683536 A1, FR 2683537 A1, FR 2683538 A1, FR 2683539 A1 and FR 2802830 A1, FR 2818165 A1, which illustrate many variations of these homopolymers, according to their molecular weight and their neutralization.

For the same type of application, it is also interesting to copolymerize acrylic acid with another carboxylic monomer such as methacrylic acid or maleic acid (see on this EP 0850 685 A1 and FR 2903618 A1) and/or with other ethylenically unsaturated monomer without carboxylic function such as an ester (meth)acrylic: the latter variant is described in the documents cited in the preceding paragraph.

It means, in terms of legislation and environmental requirements, to reduce the amount of polymer used is a priority for the art, provided it can accommodate a level of performance equivalent to that obtained so far. Of these performances, it especially emphasizes the stability of aqueous suspensions made, as determined by Brookfield™ viscosity measurements at different times, and the final solids content expressed in % by dry weight of mineral matter relative to the total weight of said suspensions.

In this regard, the document FR 2894846 A1 teaches the implementation of fluorinated compounds with polyacrylates of the prior art, thereby reducing their dose in processes of dispersion and grinding of mineral matter. However, fluorinated compounds remain scarce and expensive products, which in turn could have a negative impact on the environment.

We also know that reducing the polydispersity index of acrylic polymers gives them the properties of dispersion and grinding aid improved. To do this, one approach is to isolate, for a given polymer, the chains of a certain molecular weight by separation techniques, static or dynamic, in the presence of solvents, as described in EP 0499267 A1. Another way is based on the implementation of the "controlled" radical polymerization (CRP). This term refers to synthesis techniques based on the use of specific chain transfer agents such as xanthate or trithiocarbonate (see EP 1529065 A1 and EP 1 377 615A1).

By reducing the polydispersity index of acrylic polymers produced, it increases their ability to disperse or to facilitate the grinding of mineral matter in water. This is described in the documents "Dispersion of calcite by poly (sodium acrylate) Prepared by Reversible Addition-Fragmentation chain Transfer (RAFT) polymerization" (Polymer (2005), 46 (19), pp. 8565-8572) and "Synthesis and Characterization of Poly (acrylic acid) Produced by RAFT Polymerization. Application as a Very Efficient Dispersant of $CaCO_3$, Kaolin, and $TiO_2$" (Macromolecules (2003), 36 (9), pp. 3066-3077).

However, recent solutions based on separation techniques or CRP, are sometimes difficult to implement: they require special facilities which do not necessarily have any to industrial unit. Finally, French Patent Application FR 2 940 141 relates to the neutralization of polyacrylates by lithium hydroxide, which can reduce the amount of polymer to disperse and/or facilitate the grinding in water of calcium carbonate. However, lithium hydroxide, which is also the subject of the patent application WO 2010/063757, remains an extremely expensive compound, which does pose serious environmental problems (see the provisions on the recycling of this compound).

To propose a simple solution to improve the performance of the prior art polyacrylates as dispersants and grinding aid of mineral matter in an aqueous medium, as mentioned, making it possible to decrease the amount to a level equivalent performance, satisfactorily, is so far an unsolved problem.

Continuing his research in this area, the Applicant has succeeded in developing a method for producing an aqueous suspension of mineral matter by dispersion and/or grinding in the presence of at least one amine and at least one vinyl-carboxylic polymer, as an agent to reduce the amount of the said polymer, the latter being completely neutralized by an agent other than the amine.

So totally unexpected, the combination of the amine and vinyl-carboxylic polymer allows to disperse and/or facilitate the grinding in an aqueous medium of a mineral, more effective than the acrylic polymer used without the amine. We prove that for a level of performance at least equivalent (in terms of dry extract and Brookfield™ viscosity measured at 10 rounds/minute, for a given particle size) we are able, according to the invention, to reduce the amount of vinyl-carboxylic polymer used.

An example of amine implementation according to the invention is the AMP (2-amino-2-methyl-1-propanol, CAS #124-68-5). Furthermore, according to a preferred embodiment of the invention, the amines have implemented the specific formula (I) which will be explained below. We then show that they are more efficient than the AMP to improve the effectiveness of the dispersant according to the parameters mentioned above. It also indicates that the amines of formula (I) are already known, such as agents to develop the colour strength of a painting (see WO 2009/087 330 A1).

In the prior art, the AMP has been implemented with an acrylic polymer to disperse a to mineral matter. Reference may be made to U.S. Pat. No. 4,370,171 A1 which teaches a combination of some alkanolamines with acrylic polymers to disperse calcium carbonate. According to Example 1 of this document, we can see that the combination claimed is in fact to premix non-neutralized acrylic dispersant with an alkanolamine: in this sense, the dispersant acid is neutralized by the alkanolamine. This is not the case of our invention wherein the acrylic polymer is completely neutralized by an agent different from the amine.

Moreover, nothing in U.S. Pat. No. 4,370,171 A1 suggests that the alkanolamines described would reduce the amount of acrylic polymer, without affecting the performance of the dispersant system. In addition, the mass ratio alkanolamine: dispersant is between 0.5:1 and 1.5:1 in this document: this does not describe or suggest the preferred ratio of our invention which is between 0.05:1 and 0.35 to 1. Finally, according to another preferred embodiment of our invention not disclosed or suggested in the prior art, the compounds of formula (I) lead to the performance of particular interest, in terms of solids content and rheology of aqueous suspensions made.

Also, a first object of the present invention is the method of preparing an aqueous suspension of mineral matter comprising the steps:

a) Make available at least one mineral matter,
b) Preparing an aqueous suspension comprising at least the mineral from step a),
c) grinding the mineral matter from the aqueous suspension of step b),
d) and possibly to select and/or concentrate the aqueous suspension of step c) before dispersing the concentrate obtained characterized in that we add at least one amine and one vinyl-carboxylic polymer completely neutralized by a neutralizing agent of a different amine between steps a) and/or b) and/or c) or during step c) or after step c) during or after the dispersion of the concentrate obtained.

"Preparing an aqueous suspension comprising at least the mineral matter" means in this patent application "to form an aqueous suspension" by the addition of the mineral in to water stirred with or without the addition of dispersants until obtain a dry extract expressed as a percentage by dry weight of mineral matter relative to the total weight of the suspension, between 10% and 82%.

"Select" means in this patent application "to remove coarse particles having a particle size above 45 microns" by any means known in the art, including the implementation of sieve or pickers.

"Focus" means in this patent application "to increase the content of dry mineral matter from the aqueous suspension obtained in step c)" so that the concentrate obtained in the context of this patent application is recognized by the art as the result of concentration means known in the prior art, such as mechanical concentration, for example by the implementation of centrifuge or filter press or press-tube or combinations thereof, or as thermal concentration, such as evaporation or a combination of mechanical and thermal concentration. The concentrate thus obtained is also known by the synonyms of "cake" or "filter cake".

This process is characterized in that the weight ratio amine: vinyl-carboxylic polymer is between 0.05:1 and 0.35 to 1, preferably between 0.10:1 and 0.30:1.

In a first variant this method is characterized in that the amine is selected from dimethylamine, monoethanolamine, diethanolamine, triethanolamine, N-2,3,4,6,7,8,9,10-octahydropyrimido[1,2-a]azepine (DBU; CAS No. 6674-22-2), the 2,2-diazabicyclo[2.2.2]octane (DABCO; CAS No. 280-57-9).

In a second preferred variant, the process is also characterized in that the amine has the formula (I):

$NR_1R_2R_3$ (I)

with $R_1$, $R_2$, $R_3$ identical or different, chosen from:
a linear or branched alkyl or oxyalkyl radical having from 1 to 12 carbon atoms,
a cycloalkyl radical having from 3 to 12 carbon atoms,
a linear hydroxyl alkyl having from 1 to 6 carbon atoms,
provided that:
at the most one group $R_2$ or $R_3$ is hydrogen,
at least one of $R_1$, $R_2$, $R_3$ groups contains an OH group,
at least one of $R_1$, $R_2$, $R_3$ includes at least one branch in position α to the nitrogen atom.

In this variant, this process is characterized in that in formula (I), $R_1$ is hydrogen, $R_2$ and $R_3$ are identical or different, chosen from:
a linear or branched alkyl or oxyalkyl radical or branched radical having from 1 to 12 carbon atoms,
a cycloalkyl radical having from 3 to 12 carbon atoms,
a linear hydroxyl alkyl radical having from 1 to 6 carbon atoms,
provided that:
at the most one group of $R_2$ or $R_3$ contains an OH group,
at least one of $R_2$ or $R_3$ group includes at least one branch in position α to the nitrogen atom.

In this variant, this process is also characterized in that in formula (I), each alkyl or cycloalkyl or oxyalkyl radical contains from 3 to 10, preferably from 3 to 8 carbon atoms.

In this variant, this process is also characterized in that, in formula (I), one or more radicals carrying the OH group has 2 or 3, preferably 2 carbon atoms.

In this variant, this process is also characterized in that in formula (I), $R_1$ is hydrogen, $R_2$ and $R_3$ are identical or different, chosen from:
a linear or branched alkyl or oxyalkyl radical or having from 3 to 8 carbon atoms,
a cycloalkyl radical having from 6 to 10 carbon atoms,
a linear hydroxyl alkyl radical having from 2 to 3, preferably 2 carbon atoms,
provided that:
at least one of $R_2$ or $R_3$ group contains an OH group,
at least one of $R_2$ or $R_3$ group includes at least one branch in position α to the nitrogen atom.

In this variant, this process is also characterized in that the amine is selected from:
N-(1-methylpropyl)-N-(2-hydroxyethylamine)
N-(1,3-dimethylbutyl)-N-(2-hydroxyethylamine)
N-(1-ethyl-3-methylpentyl)-N-(2-hydroxyethylamine)
N-(3,3',5-trimethylcyclohexyl)-N-(2-hydroxyethylamine)
N-(4-hydroxycyclohexyl)-N-(2-hydroxyethylamine).

Other amines can also be implemented. This will include heavy polyamines such as piperazine substituted or unsubstituted, amino ethyl piperazine substituted or unsubstituted, amino ethyl ethanol amine, polyether amines, primary amines with polyethylene and/or polypropylene glycol, ethylene amines such the 2-(diethylamino) ethyl amine, 2-(diisopropylamino) ethyl amine, or the pentamethyldiethylenetriamine or also N-(2-aminoethyl)ethanol amine, propylene amines such as N3-amine (3-(2-aminoethylamino)propylamine, 1,3-diaminopropane, morpholines substituted such as N-ethylmorpholine, N-methylmorpholine. It may also include products marketed under the brand Alpamine™ by the Arkema Group, particularly the Alpamine™ N72.

The molecular weight of the polymers used is not critical, provided it is not too high in which case, the polymer acts as a thickener in the community. It may be approximately 300 000 g/mol the maximum value of this molecular weight. In addition, the expert knows how to regulate and adjust the molecular weight; it may particularly be made reference to documents cited at the beginning of the application for different acrylic polymers used to facilitate the grinding or dispersing in water a mineral matter.

This process is also characterized in that the vinyl-carboxylic polymer is completely neutralized by at least one neutralizing agent selected from the hydroxides and/or oxides of calcium, magnesium, or from sodium, potassium, lithium hydroxides and mixtures thereof.

This process is further characterized in that said vinyl-carboxylic polymer is a homopolymer of acrylic acid or a copolymer of acrylic acid with another monomer.

This process is also characterized in that, for the copolymer of acrylic acid with another monomer, such another monomer is selected from methacrylic acid, maleic anhydride, to 2-acrylamido-2-methyl propane sulfonic acid, phosphoric esters of (meth)acrylates of alkylene glycol and non-ionic monomers of formula (II):

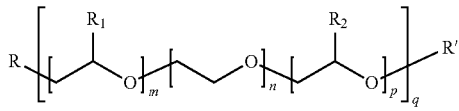

where m, n, p and q are integers and m, n, p are less than 150, q is greater than 0 and at least one integer among m, n and p is not zero, R is a radical with a function polymerizable unsaturated, $R_1$ and $R_2$ are identical or different and represent hydrogen atoms or alkyl groups, R' represents hydrogen or a hydrocarbon radical having 1 to 40 carbon atoms, or an ionic group or ionizable.

This process is further characterized in that said aqueous suspension after dispersion and/or grinding, has a solids content expressed as a percentage by dry weight of mineral matter relative to its total weight, between 10% and 82%, preferably between 50% and 81%, most preferably between 65% and 78%.

This process is also characterized in that said aqueous slurry has a content by dry weight of acrylic polymer, compared to the total dry weight of mineral matter, between 0.01% and 5.00%, preferably between 0.01% and 2.00% and most preferably between 0.05% and 1.00%.

This process is further characterized in that the mineral matter is selected from calcium carbonate, synthetic or precipitated, talc, kaolin, and mixtures thereof, preferably from natural, synthetic or precipitated calcium carbonate and mixtures thereof, and is preferably a natural calcium carbonate.

This natural calcium carbonate is preferably selected from limestone, marble, calcite, chalk, dolomite and mixtures thereof.

The following examples will illustrate the invention without limiting its scope.

EXAMPLES

All particle size distributions and diameters indicated are determined with a Sedigraph 5100™, marketed by Micromeritics™.

In all tests, ppm of dry products is indicated by the dry weight of mineral matter used.

Example 1

This example describes the grinding of calcium carbonate (calcite from Orgon, France) to in water, for implementation during the grinding stage of a homopolymer of acrylic acid, alone or in combination with certain amines.

The grinding is performed on a laboratory device, Dyno Mill type, KDL™ type, the volume of the grinding chamber being 1.4 liters, and the grinding body is made up of 2500 grams of corundum balls with a diameter between 0.6 and 1 mm.

In practice, we first introduced the acrylic polymer, then the amine, and then we proceed with the grinding operation.

In addition, the grinding is carried out using techniques well known to those skilled in the art, and in particular described in FR 2539137 A1, FR 2683536 A1, FR 2683537 A1, FR 2683538 A1, FR 2683539 A1 and FR 2802830 A1 and FR 2818165 A1.

Test No. 1-a

This test illustrates the prior art and implements 3500 ppm of a homopolymer of acrylic acid, in which 70 mol % of carboxylic sites are neutralized by the sodium ion and 30% calcium ion, and molecular weight as determined by GPC equal to 5500 g/mol.

Test No. 1-b

This test illustrates the prior art and implements 3500 ppm of a homopolymer of acrylic acid, in which all carboxylic sites are neutralized by an amine which is 2-amino-2-methyl-1-propanol, and with a molecular weight as determined by GPC equal to 5500 g/mol. This test illustrates the prior art so as described in U.S. Pat. No. 4,370,171 A1 already discussed earlier, when the dispersant is first neutralized with an alkanolamine.

Test No. 2

This test illustrates the invention and implements 3300 ppm of a homopolymer of acrylic acid, in which 70 mol % of carboxylic sites are neutralized by the sodium ion and 30% by the calcium ion, and with a molecular weight as determined by GPC equal to 5500 g/mol, in combination with 800 ppm of an amine of formula (I) which is N-(1-methylpropyl)-N-(2-hydroxyethylamine).

Test No. 3

This test illustrates the invention and implements 3150 ppm of a homopolymer of acrylic acid, in which 70 mol % of carboxylic sites are neutralized by the sodium ion and 30% by the calcium ion, and with a molecular weight as determined by GPC equal to 5500 g/mol, in combination with 800 ppm of an amine of formula (I) which is N-(1-methylpropyl)-N-(2-hydroxyethylamine).

For each test No. 1-3, measurements of solids content (SC), the percentage by weight of particles having a diameter less than 2 microns (%<2 microns) and Brookfield™ viscosities at 25° C. and 10 revolutions/minute at t=0 (BK10 t0) and at t=8 days after shaking (BK10 t8) are shown in Table 1.

TABLE 1

| | Test No | | | |
|---|---|---|---|---|
| | 1-a | 1-b | 2 | 3 |
| Prior Art INvention | PA | PA | IN | IN |
| Dispersant (ppm) | 3500 | 3500 | 3300 | 3150 |
| Amine (ppm) | 0 | 0 | 800 | 800 |
| SC (%) | 78.3 | 78.3 | 78.4 | 78.5 |
| % <2 μm | 59 | 59 | 60 | 59.5 |
| Bk10 t0 (mPa·s) | 180 | 180 | 200 | 200 |
| Bk10 t8 (mPa·s) | 200 | 195 | 180 | 190 |

These results demonstrate that the addition of one amine reduces the amount of acrylic dispersant used, for values of Brookfield™ viscosities comparable and stable over time.

Example 2

This example describes the grinding of natural calcium carbonate (calcite from Orgon, France) in water in the presence of a homopolymer of acrylic acid and optionally an to amine.

The grinding is carried out under the same conditions as those described in the previous example, except in Test No. 8, where the amine is introduced into the suspension after grinding.

Test No. 4

This test illustrates the prior art and implements 4500 ppm of a homopolymer of acrylic acid, completely neutralized by the sodium ion, and with a molecular weight as determined by GPC equal to 5500 g/mol.

Test No. 5

This test illustrates the invention and implements 4500 ppm of a homopolymer of acrylic acid, completely neutralized by the sodium ion, and with a molecular weight as determined by GPC equal to 5500 g/mol, in combination with 800 ppm of an amine of formula (I) which is N-(1-methylpropyl)-N-(2-hydroxyethylamine).

Test No. 6

The test illustrates the invention and implements 4500 ppm of a homopolymer of acrylic acid, completely neutralized by the sodium ion, and with a molecular weight as determined by GPC equal to 5500 g/mol in combination with 800 ppm of 2-amino-2-methyl-1-propanol (AMP).

Test No. 7

This test illustrates the invention and implements 4000 ppm of a homopolymer of acrylic acid, completely neutralized by the sodium ion, and with a molecular weight as determined by GPC equal to 5500 g/mol, in combination with 800 ppm of an amine of formula (I) which is N-(1-methylpropyl)-N-(2-hydroxyethylamine).

Test No. 8

This test illustrates the invention and implements during the grinding step 4500 ppm of a homopolymer of acrylic acid, completely neutralized by the sodium ion, and with a molecular weight as determined by GPC equal to 5500 g/mol. 800 ppm of an amine of formula (I) which is N-(1-methylpropyl)-N-(2-hydroxyethylamine) were then introduced into the suspension after grinding.

For each test No. 4-8, measurements of solids content (SC), the percentage by weight of particles having a diameter less than 2 microns (%<2 microns) and Brookfield™ viscosities at 25° C. and 10 revolutions/minute at t=0 (BK10 t0) and at t=8 days after shaking (BK10 t8) are shown in Table 2.

TABLE 2

| | Test No | | | | |
|---|---|---|---|---|---|
| | 4 | 5 | 6 | 7 | 8 |
| Prior Art INvention | PA | IN | IN | IN | IN |
| Dispersant (ppm) | 4500 | 4500 | 4500 | 4000 | 4500 |
| Amine (ppm) | 0 | 800 | 800 | 800 | 800 |
| SC (%) | 76.0 | 76.1 | 76.2 | 76.2 | 76.2 |
| % <2 μm | 88.3 | 88.4 | 88.4 | 88.4 | 88.4 |
| Bk10 t0 (mPa·s) | 1570 | 770 | 770 | 800 | 790 |
| Bk10 t8 (mPa·s) | 2940 | 1470 | 2010 | 1980 | 1780 |

Results by tests No. 5, 6 and 8 compared with those obtained by test No. 4, demonstrate that the addition of one amine reduces the value of the Brookfield™ viscosities for the same dose of acrylic dispersant.

Test No. 7 on the other hand shows that it is possible to reduce the amount of acrylic dispersant by adding one amine, while also reducing the value of the Brookfield™ to viscosities.

Finally, the amine of formula (I) implemented in test No. 5 provides better results than the AMP according to Test No. 6. This result is confirmed even for a dose of acrylic dispersant lower in the case of the amine of formula (I), according to tests 7 and 8.

Example 3

This example describes the grinding of natural calcium carbonate (calcite from Orgon, France) in water, for implementation during the grinding stage of a homopolymer of acrylic acid, alone or in combination with certain amines.

The grinding is carried out under the same conditions as those described in Example 1.

Test No. 9

This test illustrates the prior art and implements 6500 ppm of a homopolymer of acrylic acid, in which 50 mol % of carboxylic sites are neutralized by the magnesium ion and 50% by the sodium ion, and with a molecular weight as determined by GPC equal to 5500 g/mol.

Test No. 10

This test illustrates the invention and implements 6500 ppm of a homopolymer of acrylic acid, in which 50 mol % of carboxylic sites are neutralized by the magnesium ion and 50% by the sodium ion, and with a weight Molecular as determined by GPC equal to 5500 g/mol, in combination with 800 ppm of 2-amino-2-methyl-1-propanol (AMP).

Test No. 11

This test illustrates the invention and implements 5850 ppm of a homopolymer of acrylic acid, in which 50 mol % of carboxylic sites are neutralized by the magnesium ion and 50% by the sodium ion, and with a weight Molecular as determined by GPC equal to 5500 g/mol, in combination with 800 ppm of 2-amino-2-methyl-1-propanol (AMP).

Test No. 12

This test illustrates the invention and implements 5850 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 800 ppm of an amine of formula (I) which is N-(1-methylpropyl)-N-(2-hydroxyethylamine).

Test No. 13

This test illustrates the invention and implements 5850 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 800 ppm of 2-aminoethanol (ethanolamine, CAS No. 141-43-5).

Test No. 14

This test illustrates the invention and implements 5850 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 800 ppm of 2,2'-iminobis-(diethanolamine, CAS Number 111-42-2).

Test No. 15

This test illustrates the invention and implements 5850 ppm of a homopolymer of to acrylic acid, in which 50 mol % of carboxylic sites are neutralized by the magnesium ion and 50% by the sodium ion, and with a molecular weight as determined by GPC equal to 5500 g/mol, in combination with 800 ppm of 2,2',2"-nitrilotris-(triethanolamine, CAS Number 102-71-6).

Test No. 16

This test illustrates the invention and implements 5850 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 800 ppm 2,3,4,6,7,8,9,10-octahydropyrimido[1,2-a]azepine (DBU; CAS Number 6674-22-2).

Test No. 17

This test illustrates the invention and implements 5850 ppm of a homopolymer of acrylic acid, in which 50 mol % of the carboxylic sites are neutralized by the magnesium ion and 50% by the sodium ion, and with a molecular weight as determined by GPC equal to 5500 g/mol, in combination with 800 ppm of 2,2-diazabicyclo[2.2.2]octane (DABCO; CAS No. 280-57-9).

Test No. 18

This test illustrates the invention and implements 5850 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with an amine blend consisting of 400 ppm of an amine of formula (I) which is N-(1-methylpropyl)-N-(2-hydroxyethylamine) and 400 ppm of 2-aminoethanol (ethanolamine, CAS No. 141-43-5).

For tests No. 9 to 18, the measurements of solids content (SC), the percentage by weight of particles having a diameter less than 2 microns (%<2 microns) and Brookfield™ to viscosities at 25° C. and 10 rounds/minute at t=0 (BK10 t0) and at t=8 days after shaking (BK10 t8) are shown in Table 3.

TABLE 3

|  | Test No. | | | | |
| --- | --- | --- | --- | --- | --- |
|  | 9 | 10 | 11 | 12 | 13 |
| Prior art | PA | IN | IN | IN | IN |
| Invention |  |  |  |  |  |
| Dispersant (ppm) | 6500 | 6500 | 5850 | 5850 | 5850 |
| Amine (ppm) | 0 | 800 | 800 | 800 | 800 |
| SC (%) | 78.4 | 80 | 78.4 | 78.4 | 78.3 |
| % <2 µm | 88.3 | 88.4 | 88.4 | 88.4 | 88.3 |
| Bk10 t0 (mPa · s) | 4180 | 1580 | 1010 | 870 | 3790 |
| Bk10 t8 (mPa · s) | 5500 | 1300 | 1070 | 840 | 3170 |

TABLE 3-continued

|  | Test No. | | | | |
| --- | --- | --- | --- | --- | --- |
|  | 14 | 15 | 16 | 17 | 18 |
| Prior Art | IN | IN | IN | IN | IN |
| INvention |  |  |  |  |  |
| Dispersant (ppm) | 5850 | 5850 | 5850 | 5850 | 5850 |
| Amine (ppm) | 800 | 800 | 800 | 800 | 800 |
| SC (%) | 78.5 | 78.4 | 78.4 | 78.4 | 78.4 |
| % <2 µm | 88.4 | 88.4 | 88.4 | 88.4 | 88.3 |
| Bk10 t0 (mPa · s) | 1670 | 2310 | 2190 | 1990 | 2310 |
| Bk10 t8 (mPa · s) | 2550 | 2440 | 3040 | 2080 | 2100 |

Comparison between Tests 9 and 10 made at an equivalent dose of acrylic polymer, we show that the amine enables us to grind at higher solids content, while decreasing the values of Brookfield™ viscosities.

Tests No. 11 to 18, compared with Test No. 9, show that by adding one amine, we manage to reduce the amount of acrylic polymer, while obtaining the same values of dry Brookfield viscosities less high.

The best results are obtained for the amine of formula (I) according to Test No. 12.

Finally, we performed a final test No. 19, outside the invention, illustrating the same dose for the polymer and the amine (such as the U.S. Pat. No. 4,370,171 A1).

It uses 2900 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 2900 ppm of N-(1-methylpropyl)-N-(2-hydroxyethylamine).

It failed to grind solids content to 77%, to obtain 88% by weight of particles having a diameter less than 2 microns, as in other tests: the suspension proved here too viscous.

Example 4

In the following tests, a coarse calcium carbonate (calcite from Orgon, France) is suspended in water at 20 wt % concentration. This suspension is stirred to prevent sedimentation, and it flows through a grinder type Dyno-Mill™ with a fixed cylinder and rotating impeller, the grinding body consists of 2,900 grams of corundum balls with a diameter between 0.6 mm and 1 mm.

At this stage, the particle size distribution is such that 60 wt. % of these have a diameter less than 1 micron.

Calcium carbonate is then concentrated by any means known to those skilled in the art until the concentration required for the application equal to 67.5% by weight of calcium carbonate.

This produces a filter cake that is essential to re-disperse so that it becomes manipulated and this by implementing an acrylic polymer alone or in combination with an amine.

This very special process called "crushing at low concentrations without a dispersing agent and then re-concentration" is particularly described in detail in EP 2044159.

These tests of filter cake dispersion are made in the presence of a copolymer of acrylic acid and maleic anhydride, and optionally an amine.

Test No. 20

This dispersion test illustrates the prior art, it implements 3500 ppm of a copolymer of acrylic acid and maleic anhydride, consisting of acrylic acid and maleic anhydride in a molar ratio equal to r 1, 36:1, with a molecular weight of 19,500 g/mol and in which 100% by mole of the acid functions are neutralized by sodium hydroxide.

Test No. 21

This test illustrates the invention and implements 3500 ppm of the same copolymer as in Test 1, in combination with 800 ppm of N-(1-methylpropyl)-N-(2-hydroxyethylamine).

Test No. 22

This test illustrates the invention and implements 3200 ppm of the same copolymer as in Test 1, in combination with 800 ppm of N-(1-methylpropyl)-N-(2-hydroxyethylamine).

For tests No. 20 to 22, the measurements of solids content (SC) and Brookfield™ viscosities at 25° C. and 10 revolutions/minute at t=0 (BK10 t0) and at t=8 days after shaking (BK10 t8) are shown in Table 4.

TABLE 4

|  | Test No. | | |
| --- | --- | --- | --- |
|  | 20 | 21 | 22 |
| Prior Art INvention | PA | IN | IN |
| Dispersant (ppm) | 3 500 | 3 500 | 3 200 |
| Amine (ppm) | 0 | 800 | 800 |
| SC (%) | 65.3 | 65.2 | 65.4 |
| Bk10 t0 (mPa · s) | 310 | 160 | 200 |
| Bk10 t8 (mPa · s) | 600 | 300 | 580 |

These results demonstrate that the addition of one amine can, at constant dose of acrylic polymer to improve the rheology of the suspension obtained, or decrease the amount of acrylic dispersant while maintaining the Brookfield™ viscosity to a level almost identical.

Example 5

This example describes the grinding of natural calcium carbonate (calcite from Orgon, France) in water, for implementation during the grinding stage of a homopolymer of acrylic acid, alone or in combination with certain amines. The grinding is carried out under the same conditions as those described in Example 1.

Test No. 23

This test illustrates the prior art and implements 12 000 ppm of a homopolymer of acrylic acid, in which 50 mol % of carboxylic sites are neutralized by the magnesium ion and 50% by the sodium ion, and with a molecular weight as determined by GPC equal to 5500 g/mol.

Test No. 24

This test illustrates the invention and implements 10 000 ppm of a homopolymer of acrylic acid, in which 50 mol % of carboxylic sites are neutralized by the magnesium ion and 50% by the sodium ion, and with a molecular weight as determined by GPC equal to 5500 g/mol, in combination with 500 ppm of 2 [(methylpropyl)amino]ethan-1-ol (CAS No. 35265-04-4).

For tests 23 and 24, measurements of solids content (SC), the percentage by weight of particles having a diameter less than 1 micron (%<1 micron) and Brookfield™ viscosities at 25° C. and 100 rpm/minute (value after 1 min) at t=0 (BK100 t0) and at t=14 days before and after shaking (BK100 t14) are shown in Table 5.

TABLE 5

|  | Test No. | |
| --- | --- | --- |
|  | 23 | 24 |
| Prior Art INvention | PA | IN |
| Dispersant (ppm) | 12 000 | 10 000 |
| Amine (ppm) | 0 | 500 |
| SC (%) | 76.0 | 75.5 |
| % <1 μm | 78 | 78 |
| Bk100 t0 (mPas) | 388 | 311 |
| Bk100 t14 after shaking (mPas) | 351 | 314 |
| Bk100 t14 before shaking (mPas) | 573 | 668 |

These results demonstrate that the addition of one amine reduces the amount of acrylic to dispersant (in this example a 20% reduction of the acrylic dispersant), while maintaining the viscosity Brookfield™ at a level almost identical and stable over time.

The invention claimed is:

1. A process for preparing an aqueous suspension of mineral matter comprising dispersing and/or grinding an aqueous suspension comprising at least one mineral matter in the presence of (i) at least one amine and (ii) a vinyl-carboxylic polymer completely neutralized by a neutralizing agent selected from the group consisting of calcium hydroxide, calcium oxide, magnesium hydroxide, magnesium oxide, sodium hydroxide, potassium hydroxide, lithium hydroxide, and any mixture thereof, wherein the weight ratio of amine:carboxylic-vinyl polymer is between 0.05:1 and 0.35:1.

2. The process according to claim 1, wherein the weight ratio of amine:carboxylic-vinyl polymer is between 0.10:1 and 0.25:1.

3. The process according to claim 1, wherein the amine is selected from group consisting of dimethylamine, monoethanolamine, diethanolamine, triethanolamine, N-methylethanolamine, 2-amino-2-methyl-1-propanol, triisopropanolamine, 2,3,4,6,7,8,9,10-octahydropyrimido[1,2-a]azepine (DBU, CAS No. 6674-22-2), and 2,2-diazabicyclo[2.2.2]octane (DABCO; CAS No. 280-57-9).

4. The process according to claim 1, wherein the amine has the formula (I):

$$NR_1R_2R_3 \qquad (I)$$

where $R_1$, $R_2$, $R_3$ are identical or different, and are chosen from:
 hydrogen,
 a linear or branched alkyl or oxyalkyl radical having 1 to 12 carbon atoms,
 a cycloalkyl radical having from 3 to 12 carbon atoms, or
 a linear hydroxyl alkyl radical having 1 to 6 carbon atoms,
provided that:
 at most one of $R_2$ or $R_3$ groups is hydrogen,
 at least one of $R_1$, $R_2$, $R_3$ groups contains an OH group, and
 at least one of $R_1$, $R_2$, $R_3$ groups includes at least one branch in position α to the nitrogen atom.

5. The process according to claim 4, wherein in formula (I), $R_1$ is hydrogen, $R_2$ and $R_3$ are identical or different, and are chosen from:
 a linear or branched alkyl or oxyalkyl radical having 1 to 12 carbon atoms,
 a cycloalkyl radical having from 3 to 12 carbon atoms, or
 a linear hydroxyl alkyl radical having 1 to 6 carbon atoms,
provided that:
 at most one of $R_2$ or $R_3$ groups contains an OH group, and
 at least one of $R_2$ or $R_3$ groups includes at least one branch in position α to the nitrogen atom.

6. The process according to claim 4, wherein in formula (I), each alkyl or cycloalkyl or oxyalkyl radical comprises from 3 to 10 carbon atoms.

7. The process according to claim 4, wherein in formula (I), each alkyl or cycloalkyl or oxyalkyl radical comprises from 3 to 8 carbon atoms.

8. The process according to claim 4, wherein in formula (I), one or more radicals containing the OH group have 3 carbon atoms.

9. The process according to claim 4, wherein in formula (I), one or more radicals containing the OH group have 2 carbon atoms.

10. The process according to claim 4, wherein in formula (I), $R_1$ is hydrogen, $R_2$ and $R_3$ are identical or different, and are chosen from:
- a linear or branched alkyl or oxyalkyl radical having from 3 to 8 carbon atoms,
- a cycloalkyl radical having 6 to 10 carbon atoms, or
- a linear hydroxyl alkyl radical having from 2 to 3, preferably 2 carbon atoms, provided that:
    at least one of $R_2$ or $R_3$ groups contains an OH group, and
    at least one of $R_2$ or $R_3$ groups includes at least one branch in position α to the nitrogen atom.

11. The process according to claim 4, wherein the amine is selected from the group consisting of:
- N-(1-methylpropyl)-N-(2-hydroxyethylamine),
- N-(1,3-dimethylbutyl)-N-(2-hydroxyethylamine),
- N-(1-ethyl-3-methylpentyl)-N-(2-hydroxyethylamine),
- N-(3,3',5-trimethylcyclohexyl)-N-(2-hydroxyethylamine), and
- N-(4-hydroxycyclohexyl)-N-(2-hydroxyethylamine).

12. The process according to claim 1, wherein the vinyl-carboxylic polymer has carboxylic acid cites that are completely neutralized by (i) sodium ions, (ii) a combination of sodium and calcium ions, or (iii) a combination of magnesium and sodium ions.

13. The process according to claim 1, wherein the vinyl-carboxylic polymer is a homopolymer of acrylic acid or a copolymer of acrylic acid with another monomer.

14. The process according to claim 13, wherein the vinyl-carboxylic polymer is a copolymer of acrylic acid with another monomer selected from methacrylic acid, maleic anhydride, 2-acrylamido-2-methyl propane sulfonic acid, phosphoric esters of (meth)acrylates of alkylene glycol and non-ionic monomers of formula (II):

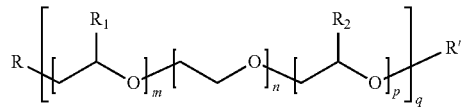

where m, n, p and q are integers and m, n, p are less than 150, q is greater than 0 and at least one integer m, n and p is not zero, R is a radical with a polymerizable unsaturated function, $R_1$ and $R_2$ are identical or different and represent hydrogen atoms or alkyl groups, R' represents hydrogen or a hydrocarbon radical having 1 to 40 carbon atoms, or an ionic group or ionizable.

15. The process according to claim 1, wherein the aqueous suspension of mineral matter has a solids content of between 10% and 82%.

16. The process according to claim 1, wherein the aqueous suspension of mineral matter has a solids content of between 50% and 81%.

17. The process according to claim 1, wherein the aqueous suspension of mineral matter has a solids content of between 65% and 78%.

18. The process according to claim 1, wherein the aqueous suspension of mineral matter has between 0.01% and 5% of vinyl-carboxylic polymer based on dry weight of mineral matter.

19. The process according to claim 1, wherein the aqueous suspension of mineral matter has between 0.01% and 2% of vinyl-carboxylic polymer based on dry weight of mineral matter.

20. The process according to claim 1, wherein the aqueous suspension of mineral matter has between 0.05% and 1% of vinyl-carboxylic polymer based on dry weight of mineral matter.

21. The process according to claim 1, wherein the mineral matter is natural calcium carbonate, precipitated calcium carbonate, talc, kaolin, or any mixture thereof.

22. The process according to claim 1, wherein the mineral matter is natural calcium carbonate.

23. The process according to claim 22, wherein the natural calcium carbonate comprises limestone, marble, calcite, chalk, dolomite, or any mixture thereof.

24. The process according to claim 1, wherein the aqueous suspension of mineral matter after dispersing and/or grinding is concentrated.

25. A filler, paper coating, paint or plastic made from the aqueous suspension of mineral matter obtained from the process of claim 1.

* * * * *